United States Patent
Bluemel et al.

(10) Patent No.: US 6,384,489 B1
(45) Date of Patent: May 7, 2002

(54) ENERGY SUPPLY CIRCUIT FOR A MOTOR VEHICLE ON-BOARD ELECTRICAL SYSTEM HAVING TWO VOLTAGE SUPPLY BRANCHES

(75) Inventors: Roland Bluemel, Plieningen; Fritz Schmidt, Waiblingen, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/414,650

(22) Filed: Oct. 8, 1999

(30) Foreign Application Priority Data

Oct. 8, 1998 (DE) ......................... 198 46 319

(51) Int. Cl.$^7$ ................................. B60L 1/00
(52) U.S. Cl. .................. 307/10.1; 307/46; 307/48; 307/82
(58) Field of Search ................. 307/46.48, 75, 307/10.1, 82; 320/127, 128, 134, 137, 140, 144, 64, 61

(56) References Cited

U.S. PATENT DOCUMENTS

| | | | | |
|---|---|---|---|---|
| 4,692,684 A | * | 9/1987 | Schaeffer ................. | 322/90 |
| 5,334,926 A | | 8/1994 | Imaizumi ................. | 320/15 |
| 5,378,977 A | * | 1/1995 | Kristiansson et al. ...... | 320/44 |
| 5,418,401 A | * | 5/1995 | Kaneyuki ................. | 307/10.1 |
| 5,483,146 A | * | 1/1996 | Schultz et al. ........... | 322/7 |
| 5,731,690 A | * | 3/1998 | Taniquichi et al. ........ | 322/28 |
| 5,798,629 A | * | 8/1998 | Terauchi ................. | 320/15 |

FOREIGN PATENT DOCUMENTS

| | | |
|---|---|---|
| DE | 38 41 769 C1 | 12/0000 |
| DE | 40 28 242 A1 | 3/1992 |
| DE | 196 00 074 A1 | 7/1997 |
| EP | 0 539 982 | 5/1993 |
| EP | 0 593 299 | 4/1994 |
| GB | 0464694 A2 * | 6/1991 ............. H02J/7/14 |
| WO | WO 84/01475 | 4/1984 |

OTHER PUBLICATIONS

Copy of Search Report from UK Patent Office. For App. No. GB 9923543.4 Feb. 1, 2000.

* cited by examiner

Primary Examiner—Josie Ballato
Assistant Examiner—Sharon Polk
(74) Attorney, Agent, or Firm—Crowell & Moring LLP

(57) ABSTRACT

In an energy supply circuit for a motor vehicle on-board electrical system with two voltage supply branches at different voltage levels, the first voltage supply branch can be fed by way of an electric direct voltage converter by the second voltage supply branch and the second voltage supply branch can be fed by a generator. A multi-level controller W3 with three voltage levels is provided whose first in/output is connected with the second voltage supply branch, whose second in/output is connected with the first voltage supply branch and whose third in/output is connected with the energy accumulator B1 assigned to the first voltage supply branch.

19 Claims, 3 Drawing Sheets

ENERGY SUPPLY CIRCUIT FOR A MOTOR VEHICLE ON-BOARD ELECTRICAL SYSTEM HAVING TWO VOLTAGE SUPPLY BRANCHES

BACKGROUND AND SUMMARY OF THE INVENTION

This application claims the priority of German patent document 198 46 319.7, filed Oct. 8, 1998, the disclosure of which is expressly incorporated by reference herein.

The invention relates to an energy supply circuit for a motor vehicle on-board electrical system having two voltage supply branches.

The development of new components in automobile construction, such as the electromagnetic valve control (EMVC) of the electrically heatable catalyst, etc., as well as the trend toward electrically driven components (which heretofore had been driven by way of belts), has considerably increased the total electric power of the consuming devices to be supplied. This power demand can no longer be reasonably satisfied by means of the current 12V electrical systems on the basis of 14V generator voltage. It is known to superimpose higher voltage levels on the 12V on-board electrical system, which feed the high-load consuming devices, such as the EMVC, the heaters, fans, servo motors, etc. Consuming devices with a lower power consumption remain at the 12V level.

It has increasingly been found that an on-board electrical system with a 42V voltage supply is desirable for high-load consuming devices, and a 12V or 14V voltage supply is desirable for low-voltage consuming devices, such as the lighting or electronic control units. The voltage level of the high-load consuming devices is thereby raised to three times the current 14V level (generator voltage).

An on-board electrical system arrangement with two batteries which can be energetically coupled is disclosed in German Patent Documents DE 40 28 242 A1 and DE 38 41 769 C1, in which the batteries are approximately at the same voltage level of 12–14V. In addition, an on-board electrical system with two voltage levels is known from German Patent Document DE 196 00 074 A1, in which the higher voltage level is implemented by a parallel connection of several chopper stages.

In a typical configuration which is known per se and which is illustrated in FIG. 3, a generator G buffered by means of an energy accumulator B2 feeds a starter S and a 42V system for the high-load consuming devices HV. The 14V system of the low-load consuming devices LV is supplied by way of an electronic power system connected on the input side with the generator G, for example, by way of a DC/DC converter W, such as a unidirectional buck converter or a bidirectional buck-boost converter. The 14V system is also buffered by means of an energy accumulator—battery B1—for emitting power peaks and against surge voltages.

The raising of the voltage level of the high-load consuming devices to 42V achieves several advantages. Rectifier losses in the generator are reduced to one third. The reduction of the currents while the power is the same permits a decrease of cable cross-sections, and facilitates the use of semiconductor switches, the replacement of screw-type connectors by plug-type connectors, etc. The relative voltage drop and the mass offset are also decreased. Additional advantages and advantageous methods of operation of the known on-board system architecture will be outlined in the following.

It is considered to be a disadvantage of the above-described on-board system configuration that the voltage limits to be specified for the 14V branch of the low-voltage consuming devices LV must comprise the full voltage level difference which occurs as a result of both the required charging voltage, on the one hand, and the discharging voltage during buffering operations for covering peak performances or the supply of consuming devices when the engine has stopped, on the other hand. Thus, for example, when a conventional lead acid battery is used for the consuming devices, a tolerance band of 11–16V is required. When other types of batteries, such as NiMH nickel metal hydride batteries, are used, a still wider tolerance band may be required because of different ratios of the end-of-charging voltage to the cell end voltage.

The voltage level difference occurring in the electrical system makes special demands on the design of the consuming devices, increases costs and may have negative effects, such as lifetime reductions in the case of bulbs.

It is an object of the invention to provide an improved on-board electrical system architecture, while maintaining the advantages of the conventional systems described above, such that a narrower tolerance band is permitted for the consuming devices.

These and other objects and advantages are achieved by the energy supply circuit according to the invention which has two voltage supply branches at different voltage levels. The first voltage supply branch can be fed by way of an electric direct voltage converter by the second voltage supply branch and the second voltage supply branch can be fed by a generator. A multi-level controller W3 with three voltage levels is provided whose one in/output is connected with the second voltage supply branch, whose second in/output is connected with the first voltage supply branch and whose third in/output is connected with the energy accumulator B1 assigned to the first voltage supply branch.

According to the invention, the low-voltage system (first voltage supply branch) is no longer directly connected with the energy accumulator B1 assigned to it but by way of a multi-level controller W3. The uncoupling of the supply of the low-voltage system from the battery terminal voltage makes it possible to control the output voltage of the first converter W1, which feeds the system of the low-voltage consuming devices LV, to a lower, narrow tolerance discharge voltage U_E, which corresponds to the discharge voltage of the battery. As a result, a narrow tolerance band (such as 11.8V . . . 12.8V) of the supply voltage can be defined, which facilitates the design and, for example in the case of bulbs, prolongs their useful life.

In a further embodiment of the invention, the uncoupling permits optimal rapid battery charging with a charging voltage U_L adapted to the temperature of the battery, without undesirable effects on the low-voltage consuming devices LV in the first voltage supply branch, which are fed with the lower, narrow-tolerance discharge voltage U_E.

As a function of the voltage ratios in the on-board electrical system, the multi-level controller W3 can be switched into additional advantageous operating modes.

Other objects, advantages and novel features of the present invention will become apparent from the following detailed description of the invention when considered in conjunction with the accompanying drawings.

DETAILED DESCRIPTION OF THE DRAWINGS

Figure 1:
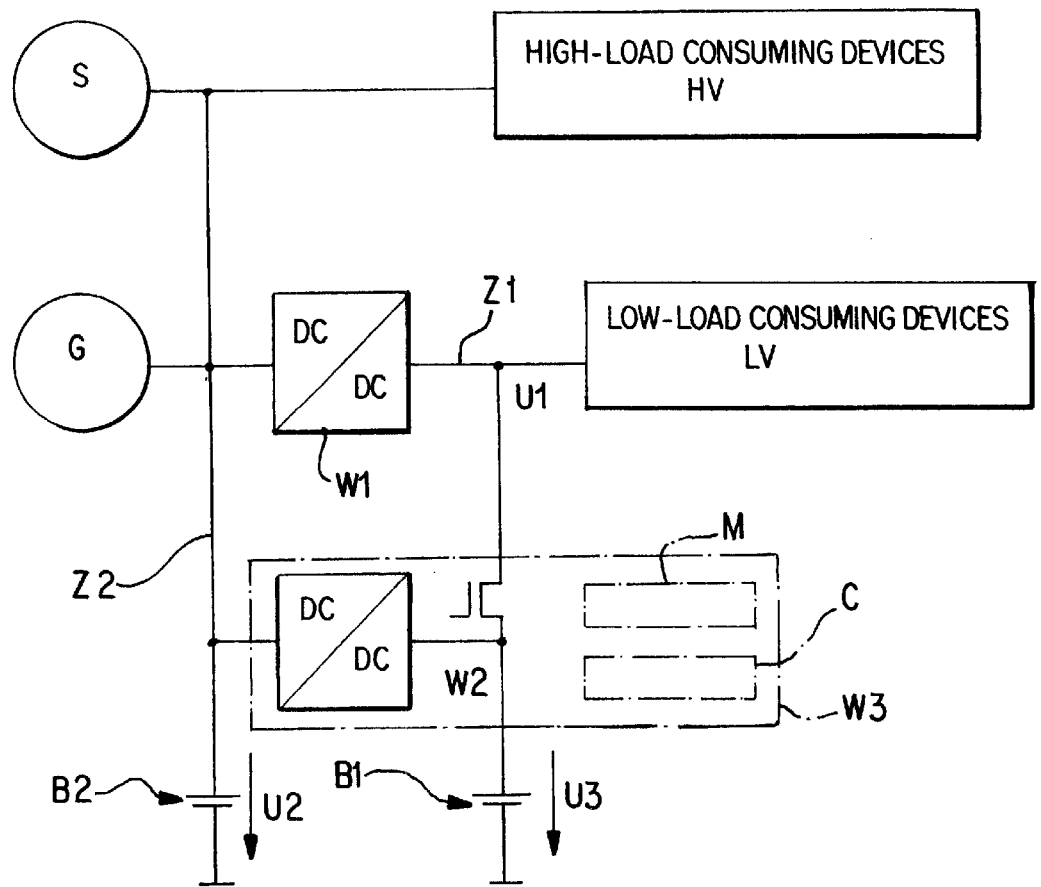
FIG. 1 is a connection diagram of the energy supply circuit according to the invention.
Figure 3:
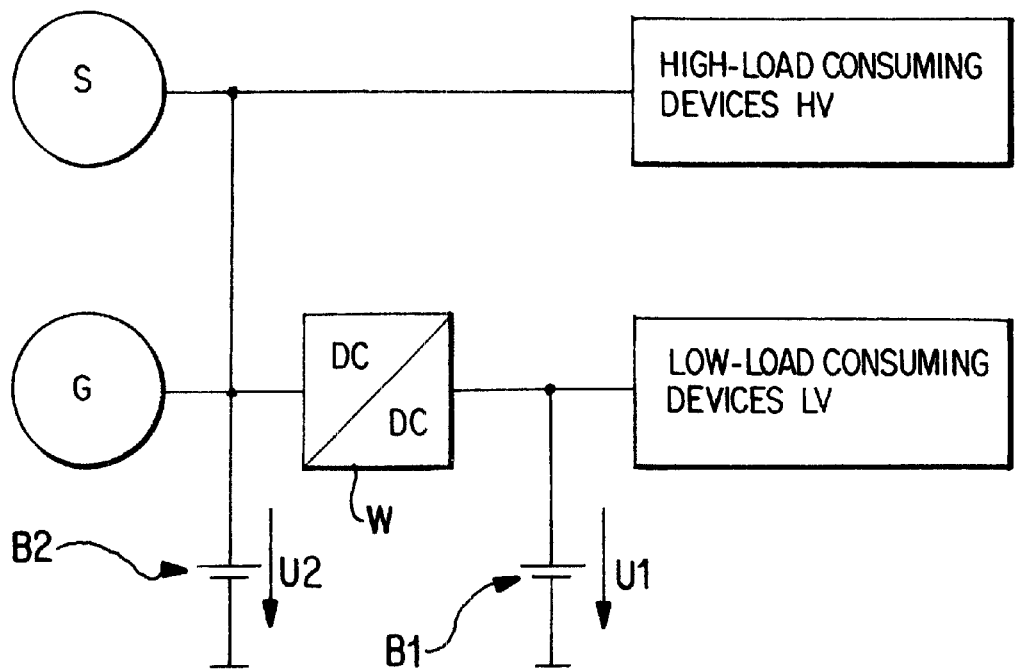
FIG. 3 is a view of the energy supply circuit according to the prior art.

FIG. 1 illustrates the energy supply circuit according to the invention which constitutes an improvement over the above-described prior art in FIG. 3. The generator G buffered by means of the energy accumulator B2 feeds the starter S and the 42V system for the high-load consuming devices HV, which are part of the second voltage supply branch Z2. The system of the low-load consuming devices LV in the first voltage supply branch Z1 is supplied by way of a DC/DC converter W1, particularly a buck converter, which is connected at its input with the second voltage supply branch Z2 and provides a constant narrow-tolerance supply voltage U1. The converter W1 is preferably designed such that it can cover the base load in the first voltage supply branch Z1.

According to the invention, the energy accumulator B1 assigned to the first voltage supply branch Z1 is coupled by means of the multiple-level controller W3 to both voltage supply branches Z1, Z2. The multi-level controller W3 permits the adjustment of the power control between its three in/outputs, each in/output being adjusted to one of the three voltage levels U1, U2, U3.

For the intended use, the multi-level controller W3 may have a simplified construction consisting of a conventional second DC converter (DC/DC converter) W2 and of a power switch (MOSFET transistor) LS, as illustrated in FIG. 1 inside the dash-dotted box. By means of the power switch LS, the power flow can be interrupted between the first energy accumulator B1 (as well as the second direct-voltage converter W2] on the one hand, and the first voltage supply system Z1, on the other hand.

Advantageously the comparatively low-cost first converter W1 is designed such that it can cover the base load in the first voltage supply branch. The multi-level controller W3 can then be adjusted so that, in normal operation, it feeds no power into the first voltage supply branch Z1.

As a function of the voltage conditions in the entire on-board electrical system, the multi-level controller W3 and the converter W2 and the power switch LS can be caused to operate in the following operating modes:

In a charging mode, the multi-level controller W3 is controlled such that the first energy accumulator B1 is fed by the second voltage supply branch Z2; for this purpose, the third in/output connected with the energy accumulator B1 is controlled to a charging voltage U_L of the energy accumulator B1. In the simplified embodiment, the power switch LS is open in the charging mode, and for charging the energy accumulator B1, the output voltage of the second converter W2 is adjusted to the end-of-charging voltage U_L, which corresponds to the voltage required for reaching a 100% full charging of the energy accumulator B1. Because the energy accumulator B1 is uncoupled from the first voltage supply branch Z1, it can be fed also in the charging operation of the energy accumulator B1 by way of the converter W1 with a narrow-tolerance discharging voltage U_E.

In a first feeding mode, when the generator has stopped, in the case of a peak load in the first voltage supply branch Z1 or in the event of a failure of the first DC voltage converter W1, a power flow can be fed from the energy accumulator B1 (which is otherwise uncoupled in the normal operation) into the first voltage supply branch Z1. In the simplified embodiment of the controller W3, for this purpose, the second direct voltage converter W2 is switched to blocking and the power switch LS is closed.

In a second feeding mode, for augmenting the supply in the first voltage supply branch Z1, a power flow can additionally be fed from the second voltage supply branch into the first voltage supply branch Z1. In the simplified embodiment of the controller W3, the power switch LS is closed for this purpose and the converter W2 is controlled such that a power flow occurs from the second voltage supply branch Z2 to the first voltage supply branch Z1, the output voltage of the converter W2 being controlled down to the discharging voltage U_E.

Optionally, feedback can also be provided from U3 to U2 to provide starting power. For this purpose, the multi-level controller W3 can be controlled to feed a power flow from the first energy accumulator B1 into the second voltage supply branch Z2 in order to establish a charging condition which is capable of starting in the second energy accumulator B2.

In a simplified embodiment, the second DC/DC converter W2 can be constructed as a bidirectional converter (buck-boost converter). Alternatively, a unidirectional converter can be connected in parallel with a bidirectional converter, both of which are adapted to the typical required power flows. The bidirectional converter is used in the reverse operation for charging the battery B2 of the second voltage supply branch Z2 from the first energy accumulator B1. In the forward operation, the parallel-connected unidirectional converter can additionally be used for covering peak loads in the first voltage supply branch Z1.

Within the scope of future on-board electrical system applications, it may be meaningful to design the first direct voltage converter W1 to also be bidirectional in order to provide an additional feedback current path here from the first voltage supply branch Z1 to the second voltage supply branch Z2.

To increase the voltage quality and the supply reliability, the first direct voltage converter W1 can be separated into several lower power converters which are distributed at different locations in the vehicle and feed into the first voltage supply branch Z1.

Despite all precautions, should an external start be required, it can be performed by charging at least one of the energy accumulators B1, B2 of the vehicle until the start and operation can take place on its own power, because in future vehicles some safety-related consuming devices will depend on operable energy accumulators. Accordingly, it is necessary to provide a corresponding feeding device for the controlled current-limited feeding. For compatibility reasons this preferably takes place on the U1 side or the U3 side, for example, on one of the converters W1, W2, W3 by means of a standard connector.

In conjunction with an appropriate management of the on-board electrical system, the structure of the on-board electrical system offers increased availability and operational reliability. The partial redundancy of the energy accumulators B1, B2 facilitates the use and the development of safety-critical systems. In particular, a redundant protection of safety-critical electronic control systems is obtained, in that these control systems can be fed from both voltage supply branches Z1, Z2.

However, the basic prerequisite is the design of the generator G for the largest occurring continuous power in the on-board electrical system. By means of appropriate electrical power system management, the required peak power can be limited and the power supply can be optimized. The management of the on-board electrical system ensures that the voltages remain within specified limits. Measures must be taken against excess voltage in the event of a load drop or an external start and against a polarity inversion. In particular, the generator must contain a high-speed decontrolling for avoiding excess voltages in the event of a load drop. A central protection against excess voltage must possibly be installed.

The two energy accumulators B1, B2 can be optimized according to their functions. It is particularly advantageous for the energy accumulator B2 to be power-optimized with respect to the supply of the starter S, for example, as a super capacitor, and for the energy accumulator B1 to be an energy-optimized battery. In the second voltage supply branch Z2, active power is provided by the generator G, while peak power is normally covered by the energy accumulator B2.

As a result of the separate energy accumulators of the two voltage levels, in conjunction with a suitable operating mode switched by the on-board electrical system management, starting reliability is increased. To ensure starting reliability, it is endeavored to not load the second energy accumulator B2 (36V battery) with quiescent current. When the internal-combustion engine is switched off, the DC/DC converter W1 is normally switched from U2 to U1 to blocked, which prevents a discharging of the energy accumulator B2 at the expense of the starting energy. Furthermore, it may be provided that consuming devices operated at U2, which can normally also be operated when the internal-combustion engine is switched off, can be switched off in an emergency by way of the on-board electrical system management.

For monitoring the charging condition of the two energy accumulators B1, B2 and/or the voltage in the two voltage supply branches Z1, Z2, a monitoring device is provided which is advantageously integrated into the multi-level controller W3, because the latter is connected with the terminal voltage of the two energy accumulators B1, B2. As a function of the detected voltage and load conditions, the monitoring device can cause the multi-level controller W3 to operate in the above-described operating modes.

To avoid excessively frequent discharging of the first energy accumulator B1 (12V battery) despite the running generator G, a power management function with power splitters controlled by it can be integrated in the vehicle. It can receive information from the multi-level controller W3 concerning the charging condition and power balance of the first energy accumulator B1. For this purpose, in addition to a communication device C (shown schematically in FIG. 1) for the communication with a power management function, a current measuring device M (shown schematically in FIG. 1) may be integrated in the multi-level controller W3. In this case, the internal resistance of the power switch LS (constructed as a MOSFET) switch can be used as the measuring resistance for the charge balancing.

For future battery technologies (such as lithium ions), a special charging regime (avoiding an overcharging and deep discharging of the battery) will be required. Such a device for charging the battery and monitoring the battery can expediently be integrated in the multi-level controller W3.

Figure 2:
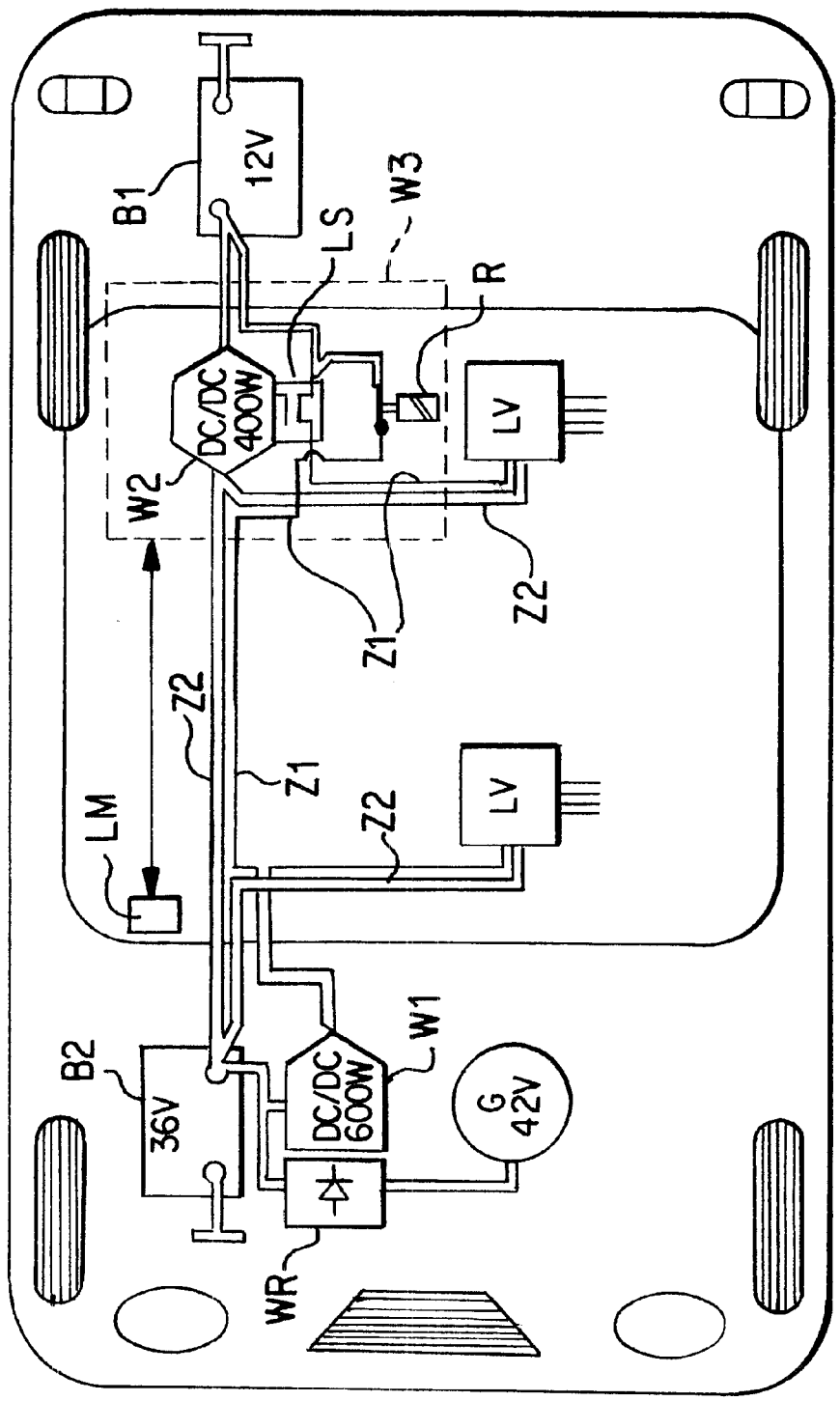
FIG. 2 is a view of an arrangement of the energy supply circuit according to the invention in the vehicle.

FIG. 2 shows a preferred embodiment of the energy supply circuit according to the invention with its spatial arrangement in the vehicle. Functionally corresponding components have the same reference numbers as in FIG. 1.

The unidirectional converter W1 is arranged in the forward part of the vehicle, and can be integrated directly in a generator inverter WR or a power splitter LV. The bidirectional converter W2 is expediently situated close to the supply battery B1 arranged in the rearward part of the vehicle.

In the two illustrated power splitters LV, the power in the two voltage supply branches Z1, Z2 is further distributed to the consuming devices (not shown in FIG. 2). The power distribution can be controllable by a superimposed power management LM as a function of the power supply.

The unidirectional converter W1 feeds a relatively narrow-tolerance 12V on-board electrical system (first voltage supply branch Z1), to which the low-voltage or low-load consuming devices LV are connected. Its output voltage U1 is controlled to a value which corresponds to the discharging voltage $U\_E$ of the battery B1. It must be dimensioned such that it covers the active power in the 12V branch Z1.

The bidirectional converter W2 supplies the battery B1, which, in the normal operation, is separated from the 12V electrical system Z1, with the optimal charging voltage $U\_L$. As required, the connection between the 12V on-board electrical system Z1 and the battery B1 is established by the controlled semiconductor switch LS (such as MosFet). The triggering device for this switch LS, which is expediently integrated in the bidirectional converter W2, detects the voltage in the 12V branch Z1 and, in the event of an overloading, establishes the connection with the output of the converter W2 and the 12V battery B1. Simultaneously, the output voltage of the converter W2 is reduced; it will now also supply current into the 12V branch Z1. if the power demand exceeds the sum of the power emission of the two converters W1, W2, the 12V battery B1 will take over the buffering.

In order to permit an external start of a vehicle having the energy supply circuit according to the invention, the direct voltage converter W2 has a bidirectional design, so that instead of starting aid, charging aid can be provided by applying a 12V voltage to the first voltage supply branch Z1. Tests have demonstrated that an intact battery B1, which, however, because of its charging condition, is unable to start, after the charging with approximately 400 W charging power, can start the engine (even at low temperatures) within an acceptable time period. Thus, the converter W2 should preferably be designed for 400 W. It is helpful that the fed charge is first stored in the double layer of the battery B2; in this manner, a virtual a power increase of the "empty" battery occurs which is normally sufficient to start the engine. However, the external charging aid should be necessary only in exceptional cases because the starting battery B2 can also be made capable of starting by the feedback from the supply battery B1. To save weight as a result of the limitation to the absolutely necessary capacity of the 12V supply battery B1, it should be ensured that this battery B1 is always maintained in a charging condition of more than 80% and is also not damaged by an overcharging as the result of an excessive charging voltage. The prerequisite is a temperature-guided controlling of the voltage which is applied to the battery B1.

A significant advantage of the circuit arrangement according to the invention is the fact that the tolerance range of the supply voltage U1 can be reduced for avoiding a shortened life due to excessive voltage (for example, of bulbs), or the optimal design of the consuming devices in the first voltage supply branch Z1. In the case of a conventional on-board electrical system, a window lifter motor must, for example, be able to consume sufficient power at 9V in order to move even sluggish windows; simultaneously, it must not be overloaded in the case of a maximal charging voltage. A reduction of the permitted voltage level difference therefore surely results in a considerable saving of material and costs of the connected consuming devices. The voltage limits indicated in conventional on-board electrical system specifications for the 14V branch contain the full voltage level difference which occurs as a result of both the necessary charging voltage and the discharging voltage of the battery B1 in the case of buffering operations for covering power peaks or the supplying of consuming devices during an engine stoppage. Satisfaction of the demand of a narrower-tolerance voltage can therefore be achieved only by the separation of the battery B1 according to the invention.

For a supply battery B1 of the lead acid type, the control voltage of the converter W1 may, for example, amount to 12.3 V. In the generator mode, a narrow-tolerance voltage level difference of approximately 11.8V to 12.8V can therefore be achieved. A similar voltage range can also be achieved by means of a three-cell lithium battery, so that the described arrangement is acceptable for future technological developments. As another advantage, the separation of the battery B1 permits the implementation of a charging regime which is optimally adapted to the respective battery technology.

In the battery mode, when the internal-combustion engine is switched off, the 12V on-board electrical system Z1 must be supplied from the 12V battery B1. To avoid losses for opening the semiconductor switch LS, it will be expedient to bridge the latter by means of a relay R connected in parallel.

The bidirectional converter W2 has access to the terminal voltages of both batteries B1, B2. Functions of the charging condition control can therefore be arranged therein. By way of a data bus (CAN BUS), this information can be made available to a superimposed power management LM or can be used internally for controlling the charge exchange between the two batteries B1, B2.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An energy supply circuit for a motor vehicle on-board electrical system comprising:
    first and second voltage supply branches having different voltage levels;
    a first direct-voltage converter coupled to feed a voltage to the first voltage supply branch from the second voltage supply branch;
    a generator coupled to supply a voltage to the second voltage supply branch;
    a first energy accumulator which buffers at least said first voltage supply branch; and
    a multi-level power distribution element having a first in/output connected with the second voltage supply branch, a second in/output connected with the first voltage supply branch, and a third in/output connected with the first energy accumulator, which multi-level power distribution element provides a variable voltage level on each of said in/outputs at one of three voltage levels, and feeds a variable distribution of the power flows via said multi-level power distribution element between said in/outputs.

2. The energy supply circuit according to claim 1, wherein the first direct-voltage converter feeds the first voltage supply branch permanently with a voltage which corresponds to a discharging voltage of the first energy accumulator.

3. The energy supply circuit according to claim 1, wherein in a charging mode, the multi-level power distribution element feeds the first energy accumulator from the second voltage supply branch, the third in/output connected with the first energy accumulator being controlled to a charging voltage of the first energy accumulator.

4. The energy supply circuit according to claim 1, wherein in normal mode, the multi-level power distribution element feeds no power flow into the first voltage supply branch.

5. The energy supply circuit according to claim 1, wherein in a first feeding mode, the multi-level power distribution element feeds a power flow from the first energy accumulator into the first voltage supply branch.

6. The energy supply circuit according to claim 1, wherein in a second feeding mode, the multi-level power distribution element is controlled such that, for buffering power peaks, in addition to a power flow from the first energy accumulator, a power flow from the second voltage supply branch can be fed into the first voltage supply branch.

7. The energy supply circuit according to claim 1, wherein in a feedback operation, the multi-level power distribution element is controlled such that, for providing starting energy, a power flow is fed from the first energy accumulator into the second voltage supply branch to establish in a second energy accumulator a charge condition which is capable of starting.

8. The energy supply circuit according to claim 1, further comprising a monitoring device integrated in the multi-level power distribution element for monitoring a charging condition of the first and second energy accumulators and/or for monitoring the voltage in the two voltage supply branches.

9. The energy supply circuit according to claim 1, further comprising a monitoring device integrated in the multi-level power distribution element for balancing a charge for the first energy accumulator.

10. The energy supply circuit according to claim 9, wherein:
    said multi-level power distribution element includes a power switch in the form of a MosFet, for selectively coupling and uncoupling said first energy accumulator to and from said first voltage supply branch; and
    an internal resistance of the power switch is used as a current measuring resistance for charge balancing.

11. The energy supply circuit according to claim 9, further comprising a communication device provided in the multi-level power distribution element for communication with a power management device for the on-board electrical system.

12. The energy supply circuit according to claim 1, further comprising a device integrated in the multi-level power distribution element for monitoring and charging said first energy accumulator.

13. The energy supply circuit according to claim 1, wherein
    the multi-level power distribution element comprises a power switch;
    by means of the second direct voltage converter, a power flow can be controlled from the second voltage supply branch to the first energy accumulator; and
    by means of the power switch, the first voltage supply branch can be separated from the first energy accumulator and the direct voltage converter.

14. An energy supply circuit for an electrical system having at least a first voltage supply branch which is energized at a first voltage level, and a second voltage supply branch which is energized at a second voltage level, said energy supply circuit comprising:
- a generator for supplying electric power to said second voltage supply branch at a voltage approximately equal to said second voltage level;
- a direct voltage converter for supplying electric power from said second voltage supply branch to said first voltage supply branch at a voltage approximately equal to said first voltage level;
- a first electric energy accumulator for buffering said voltage supplied to said first voltage supply branch by said direct voltage converter; and
- a multi-level power distribution element for selectively controlling a flow of electric energy between said second voltage supply branch, said first voltage supply branch and said first electric energy accumulator, said multi-level power distribution element selectively coupling and uncoupling said first electric energy accumulator with said first voltage supply branch, and selectively providing a flow of electric energy through said multi-level power distribution element, from said second voltage supply branch to said first electric energy accumulator or to said first voltage supply branch and said first electric energy accumulator.

15. The energy supply circuit according to claim 14, wherein said electrical system is a vehicle, and said second voltage supply branch includes a second electric energy accumulator and an electric starter motor.

16. The energy supply circuit according to claim 14, wherein said multi-level power distribution element has a first operating mode wherein said first electric energy accumulator is uncoupled from said first voltage supply branch, and electric energy is supplied to said first electric supply branch solely by said second voltage supply branch via said direct voltage converter.

17. The energy supply circuit according to claim 16, wherein said multi-level power distribution element has a second operating mode wherein said first electric energy accumulator is uncoupled from said first voltage supply branch, and energy from said second voltage supply branch charges said first electric energy accumulator.

18. The energy supply circuit according to claim 17, wherein said multi-level power distribution element has a third operating mode wherein said first electric energy accumulator is coupled to supply electric energy to said first voltage supply branch, and a transfer of energy from said second voltage supply branch to said first electric supply branch is blocked.

19. The energy supply circuit according to claim 18, wherein said multi-level power distribution element has a fourth operating mode wherein said first electric energy accumulator is coupled to said first voltage supply branch, and said multi-level controller supplies electric energy from said second electric supply branch to said first electric supply branch.

* * * * *